United States Patent
Tringale et al.

(10) Patent No.: US 9,952,776 B1
(45) Date of Patent: Apr. 24, 2018

(54) AUTOMATIC NON-DISRUPTIVE CONGESTION CONTROL OF A FABRIC IN A DATA STORAGE SYSTEM

(71) Applicant: EMC Corporation, Hopkinton, MA (US)

(72) Inventors: Alesia Tringale, Worcester, MA (US); Sean Pollard, Methuen, MA (US); Julie Zhivich, Westborough, MA (US); Jerome Cartmell, Natick, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 263 days.

(21) Appl. No.: 14/808,238

(22) Filed: Jul. 24, 2015

(51) Int. Cl.
*G06F 3/06* (2006.01)
*G06F 13/40* (2006.01)
*H04L 12/26* (2006.01)

(52) U.S. Cl.
CPC .......... *G06F 3/0611* (2013.01); *G06F 3/0665* (2013.01); *G06F 3/0689* (2013.01); *G06F 13/4022* (2013.01); *H04L 43/0894* (2013.01)

(58) Field of Classification Search
CPC .... G06F 3/0611; G06F 3/0665; G06F 3/0689; G06F 13/4022; H04L 43/0894
See application file for complete search history.

(56) References Cited

U.S. PATENT DOCUMENTS

| | | | | |
|---|---|---|---|---|
| 7,002,980 B1* | 2/2006 | Brewer | ................... | H04L 47/10 370/229 |
| 7,403,976 B2* | 7/2008 | Brown | ................... | H04L 47/30 370/395.7 |
| 7,707,304 B1* | 4/2010 | Lolayekar | ............... | H04L 47/10 709/232 |
| 2003/0200315 A1* | 10/2003 | Goldenberg | ............ | H04L 47/10 709/225 |
| 2004/0092278 A1* | 5/2004 | Diepstraten | ............. | H04L 47/14 455/512 |

\* cited by examiner

*Primary Examiner* — Tim T Vo
*Assistant Examiner* — Herve Iradukunda
(74) *Attorney, Agent, or Firm* — Anderson Gorecki LLP (57) ABSTRACT

Storage node blades in a data storage system utilize queue pairs associated with point-to-point links to perform RDMA transactions with memory components associated with other storage node blades. Higher quality of service queue pairs are used for system message transactions and lower quality of service queue pairs are used for remote direct memory access data. Postings to a relatively higher priority queue pair are reduced when a corresponding relatively lower priority queue pair between the same pair of storage nodes via the same switch is starved of bandwidth. Postings to the relatively higher priority queue pair are increased when bandwidth starvation is remediated.

20 Claims, 10 Drawing Sheets

QP Mappings 400

QP$^0_{1-2}$   Addr/pntr   LID

QP$^1_{1-2}$   Addr/pntr   LID

QP$^0_{1-3}$   Addr/pntr   LID

QP$^1_{1-3}$   Addr/pntr   LID

. . .

QP$^0_{3-1}$   Addr/pntr   LID

QP$^1_{3-1}$   Addr/pntr   LID

. . .

QP$^0_{4-1}$   Addr/pntr   LID

QP$^1_{4-1}$   Addr/pntr   LID

AUTOMATIC NON-DISRUPTIVE CONGESTION CONTROL OF A FABRIC IN A DATA STORAGE SYSTEM

BACKGROUND

Aspects of this disclosure are generally related to data storage systems which can be used to maintain relatively large data sets and support a relatively large number of concurrent users. The basic building blocks of a scalable data storage system may include storage engines or storage servers. A plurality of storage engines or storage servers are interconnected in order to function together as a storage array or storage server cluster. Additional storage engines or servers may be added to increase capabilities of the data storage system. Each storage array or storage server cluster typically includes multiple physical storage devices which are used to present logical storage devices to instances of applications running on host devices. A wide variety of technologies can be used to interconnect storage engines and storage servers, including but not limited to Infiniband, PCI-X, Fibre Channel, Gigabit Ethernet, and various proprietary technologies.

SUMMARY

All examples, aspects and features mentioned in this document can be combined in any technically possible way.

In accordance with an aspect, an apparatus comprises: a data storage system comprising: a plurality of data storage devices; a plurality of storage nodes configured to access the data storage devices and communicate with another device; and a first switch and a second switch, each of which interconnects each pair of the storage nodes via a plurality of prioritized point-to-point links; wherein each storage node is configured to utilize the point-to-point links to access memory components associated with other storage nodes of the plurality of storage nodes, and to reduce postings to a relatively higher priority link when a corresponding relatively lower priority link between a pair of storage nodes via the first switch is starved of bandwidth. In some implementations a queue pair is uniquely associated with each point-to-point link, each queue pair comprising a transmit queue and a receive queue. In some implementations the point-to-point links are prioritized in terms of quality of service. In some implementations quality of service comprises latency. In some implementations a path manager is configured to select a queue pair from a queue pool based on a quality of service indicated by a requesting client. In some implementations system message transactions use higher quality of service queue pairs than remote direct memory access data. In some implementations the path manager is configured to monitor the queue pairs for bandwidth utilization on a per queue pair basis. In some implementations, in response to detecting that a first queue pair is starved of bandwidth by a second queue pair as determined based on per queue pair monitoring, the path manager reduces postings to the second queue pair. In some implementations the path manager reduces postings to the second queue pair by pulling the second queue pair out of the queue pair pool. In some implementations, in response to detecting that bandwidth starvation of the first queue pair by the second queue pair is remediated, the path manager increases postings to the second queue pair.

In accordance with an aspect a method comprises: in a data storage system comprising a plurality of data storage devices, a plurality of storage nodes configured to access the data storage devices and communicate with another device, and a first switch and a second switch, each of which interconnects each pair of the storage nodes via a plurality of prioritized point-to-point links: utilizing the point-to-point links to access memory components associated with other storage nodes of the plurality of storage nodes; and reducing postings to a relatively higher priority link when a corresponding relatively lower priority link between a pair of storage nodes via the first switch is starved of bandwidth. In some implementations the method comprises maintaining a queue pair uniquely associated with each point-to-point link, each queue pair comprising a transmit queue and a receive queue. In some implementations the method comprises associating a quality of service with each point-to-point link. In some implementations quality of service comprises a latency associated with utilizing the point-to-point links to other storage nodes of the plurality of storage nodes. In some implementations the method comprises a path manager selecting a queue pair from a queue pool based on a quality of service indicated by a requesting client. In some implementations the method comprises using higher quality of service queue pairs for system message transactions and lower quality of service queue pairs for remote direct memory access data. In some implementations the method comprises the path manager monitoring the queue pairs for bandwidth utilization on a per queue pair basis. In some implementations the method comprises, in response to detecting that a first queue pair is starved of bandwidth by a second queue pair as determined based on per queue pair monitoring, the path manager reducing postings to the second queue pair. In some implementations the method comprises the path manager reducing postings to the second queue pair by pulling the second queue pair out of the queue pair pool. In some implementations the method comprises, in response to detecting that bandwidth starvation of the first queue pair by the second queue pair is remediated, the path manager increasing postings to the second queue pair.

DETAILED DESCRIPTION

Figure 1:
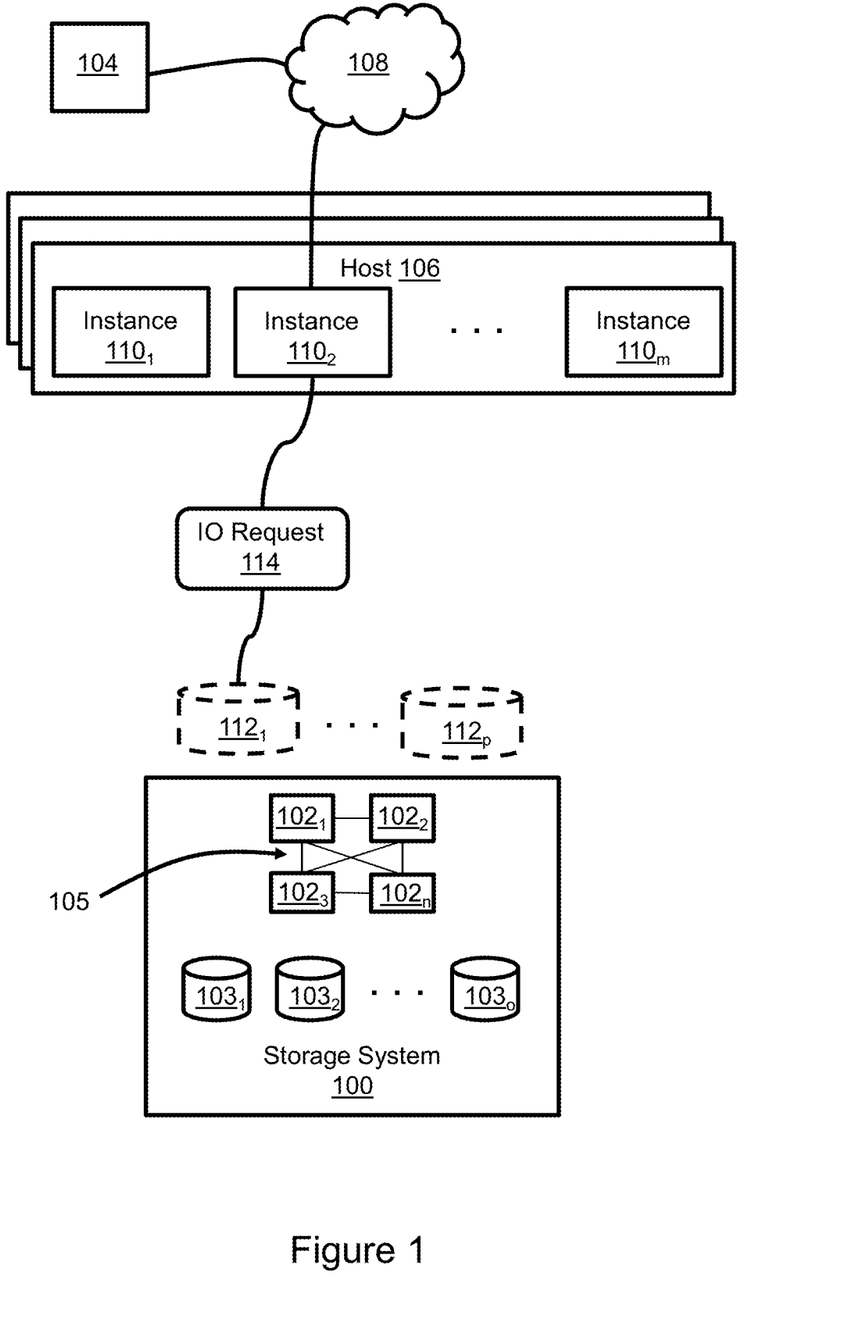
FIG. 1 illustrates a scalable data storage system in a network environment.

FIG. 1 illustrates a data storage system 100 that maintains data and supports IOs associated with a large number of concurrent users. The data storage system includes multiple storage nodes $102_1$-$102_n$ and multiple data storage devices $103_1$-$103_o$ which are physical components and provide non-transitory storage. The system can be scaled by changing the number of storage nodes and data storage devices. Each storage node is connected to every other storage node via an interconnecting fabric 105, e.g., in a dual star configuration including separate point-to-point links for each connection between pairs of storage nodes. Moreover, each printed circuit board "blade" in the system may be interconnected via the fabric. The point-to-point links provide high speed communications and may support operations such as RDMA (Remote Direct Memory Access). The interconnection of the storage nodes and RDMA capability enable the storage nodes to function together as a single device in some respects as will be explained in greater detail below. Those skilled in the art will appreciate that the storage nodes $102_1$-$102_n$ could include storage engines, storage servers, or other devices. The storage devices $103_1$-$103_o$ may include pools of different types of devices which are organized into hierarchical tiers. For example and without limitation, the storage devices may include a storage pool of flash drives at tier 0, a storage pool 132 of FC (Fibre Channel) drives at tier 1, and a storage pool 134 of SATA (serial advanced technology attachment) drives at tier 2.

An exemplary computing device 104 such as a user terminal or server uses the data storage system 100 by communicating with a host device 106 via a network 108. Many computing devices may utilize the data storage system concurrently but only one computing device 104 is illustrated for clarity. Multiple host devices 106 may be associated with the storage system 100, and each host device may host any of a wide variety of applications. An exemplary host device may be a type of server which hosts one or more instances $110_{1-m}$ of an application such as a database, for example and without limitation, for which the corresponding data is maintained by the data storage system 100. The data storage system 100 may create logical storage devices $112_1$-$112_p$ for presentation to the host device, although a system admin might create the logical storage devices for any of a variety of purposes. The logical storage devices, which may be referred to as or by LUNs (logical unit numbers) or meta-volumes, may be presented to the host as a set of contiguous address locations. The application and the host device will typically be unaware of the actual location of data on the physical storage devices. A communication between the computing device 104 and an instance of an application running on the host 106 may prompt data access. A corresponding IO request 114 sent to the storage system 100 by the application instance $110_2$ in order to read or write data will reference a location in a particular logical storage device, e.g., logical storage device $112_1$. The storage nodes $102_1$-$102_n$ maintain a mapping between the logical storage devices $112_1$-$112_p$ and the physical storage devices $103_1$-$103_o$. The data stored on each logical storage device may be distributed across multiple physical storage devices, and extents of data may be moved between physical storage devices in response to tiering decisions and other factors. Any of the storage nodes $102_1$-$102_n$ can receive and process the IO request 114, e.g., by writing data to the physical storage devices or reading data from the physical storage devices and sending the data to the host. Consequently, the storage nodes share loading, and the failure of a storage node does not prevent a host device from accessing the storage system.

Figure 2:
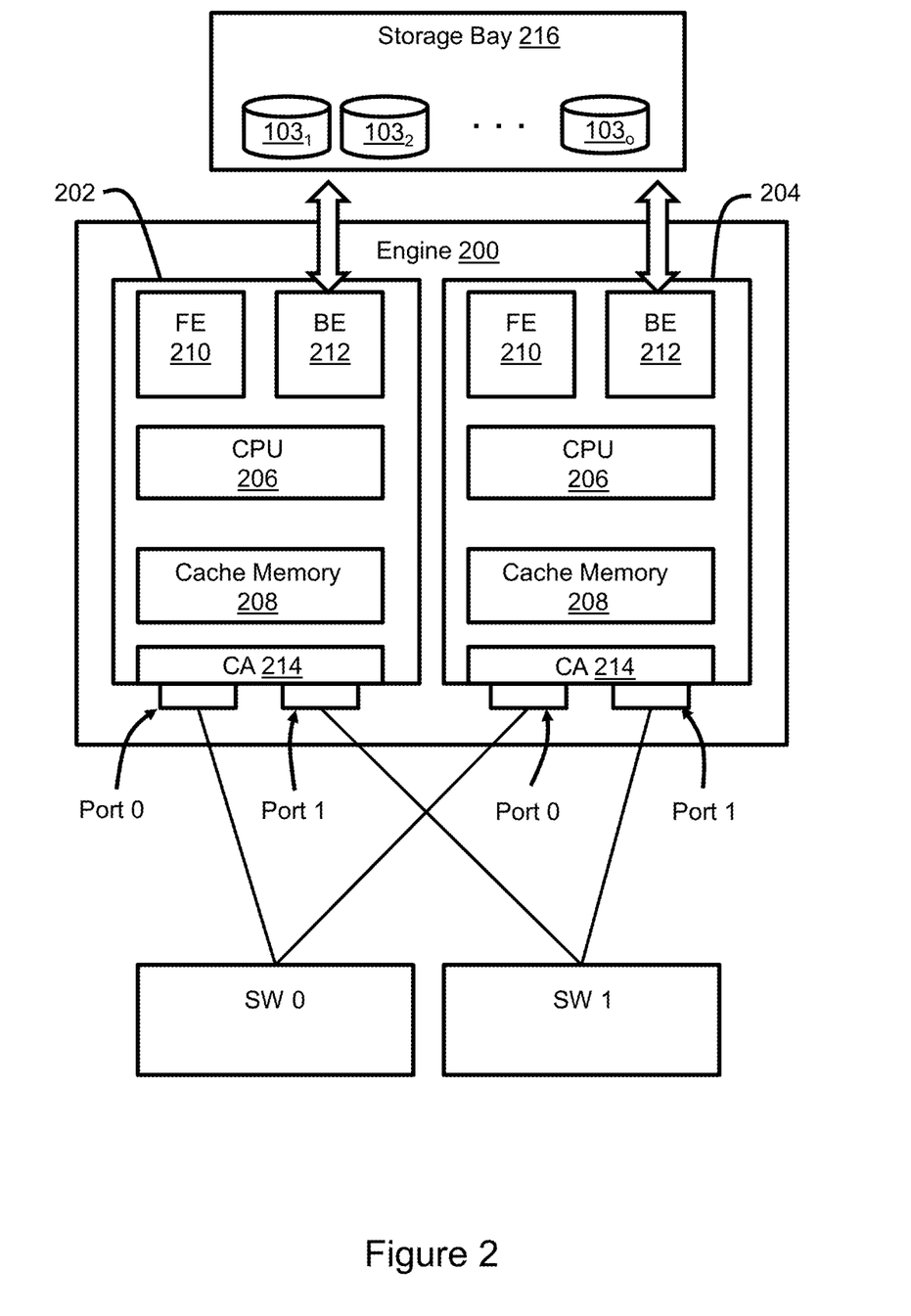
FIG. 2 illustrates an implementation of a storage node of the data storage system in greater detail.

FIG. 2 illustrates an implementation of a storage node $102_n$ (FIG. 1) in greater detail. In the illustrated example the storage node is a storage engine 200 which includes two storage directors 202, 204. Each storage director includes a multi-core CPU 206, a cache memory 208, a front end module 210, and back end module 212, and a channel adapter 214, all of which may be on a single printed circuit board blade. The front end module 210 is configured to interface with the host devices 106 (FIG. 1). For example, the front end module presents the logical storage devices, receives IO requests from host application instances, and provides data in response to read requests. The back end module 212 interfaces with a storage bay 216 which contains the back end physical storage devices $103_1$-$103_o$. For example, the back end module reads data from and writes data to the back end storage devices. The CPU 206 runs a variety of programs configured to cause the director to perform IOs and other functions. The cache memory 208, which may include volatile memory components such as RAM (random access memory) chips for example and without limitation, includes a section which is allocated for temporarily storing data that is being written to or read from the back end storage devices. For example, data that is being written by a host device is initially copied to the cache and subsequently destaged to the back end storage devices. Data that is being read by a host device is copied from the back end storage devices to cache and then provided to the host via the back-end module. Data may be also copied to the cache from the back end storage devices in response to a hint. When data corresponding to an IO request is already in the cache, i.e., a "cache hit," then that cached copy of the data can be used to service the IO request without accessing back end storage. When the data being accessed is not already in the cache, i.e. a "cache miss," then that data must be copied into the cache in order to service the IO request, e.g., copied into cache from back end storage in response to a read request. Generally, any data that has not been accessed recently or within a predetermined period of time may be flushed from the cache and written to the back end storage devices. The storage directors 202, 204 may operate in parallel such that IO requests are concurrently serviced and the failure of one director does not cause the failure of other directors.

Referring to FIGS. 1 and 2, the section of the cache 208 of each director that is used to temporarily store selected data as described above is shared globally within the data storage system 100. More particularly, any director in the data storage system can write to and read from the cache of the other directors in the data storage system. Consequently, if a director associated with storage node $102_1$ receives a request to access data that is in the cache of a director associated with storage node $102_3$ it is considered as a cache hit. The director associated with storage node $102_1$ accesses the data from the cache of the director associated with storage node $102_3$ and, for example, provides the data to the host via the front end module or writes to the cache of the director associated with storage node $102_3$.

Figure 3:
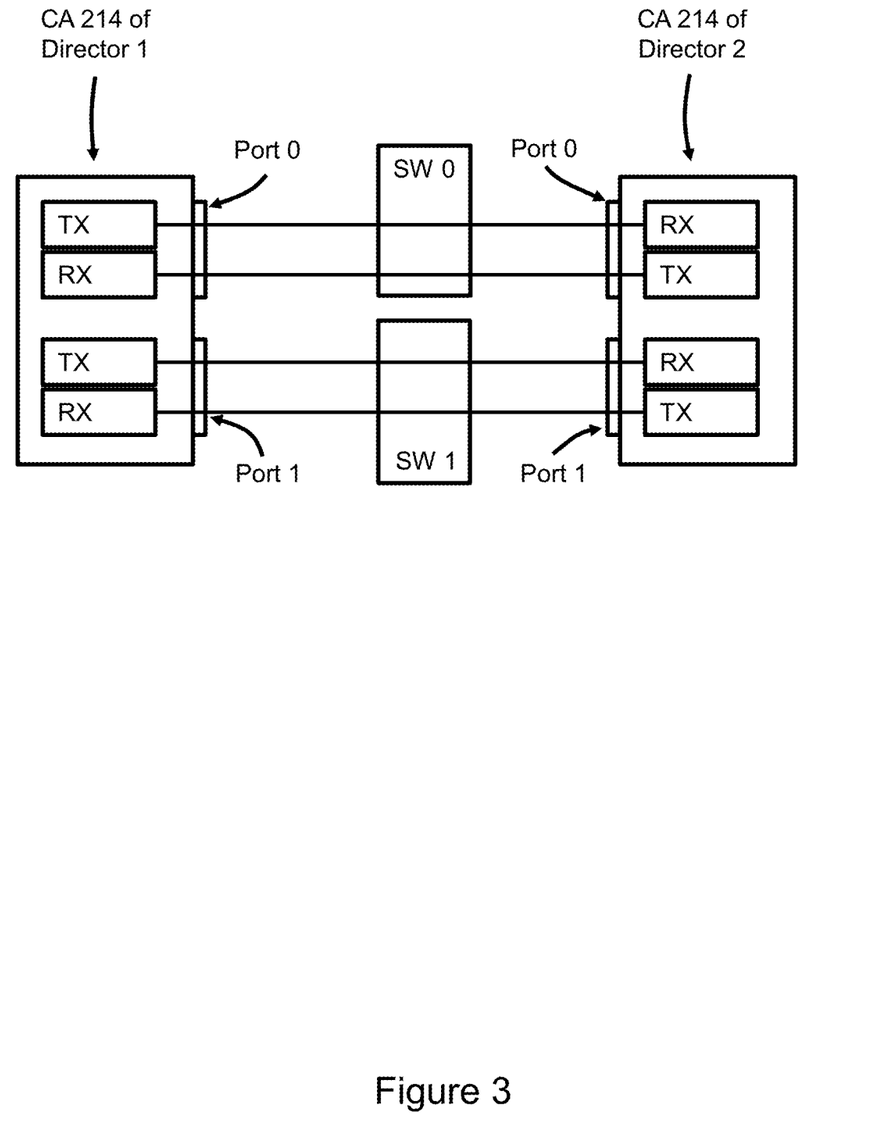
FIG. 3 illustrates interconnection of storage nodes via channel adapters in greater detail.
Figure 4:
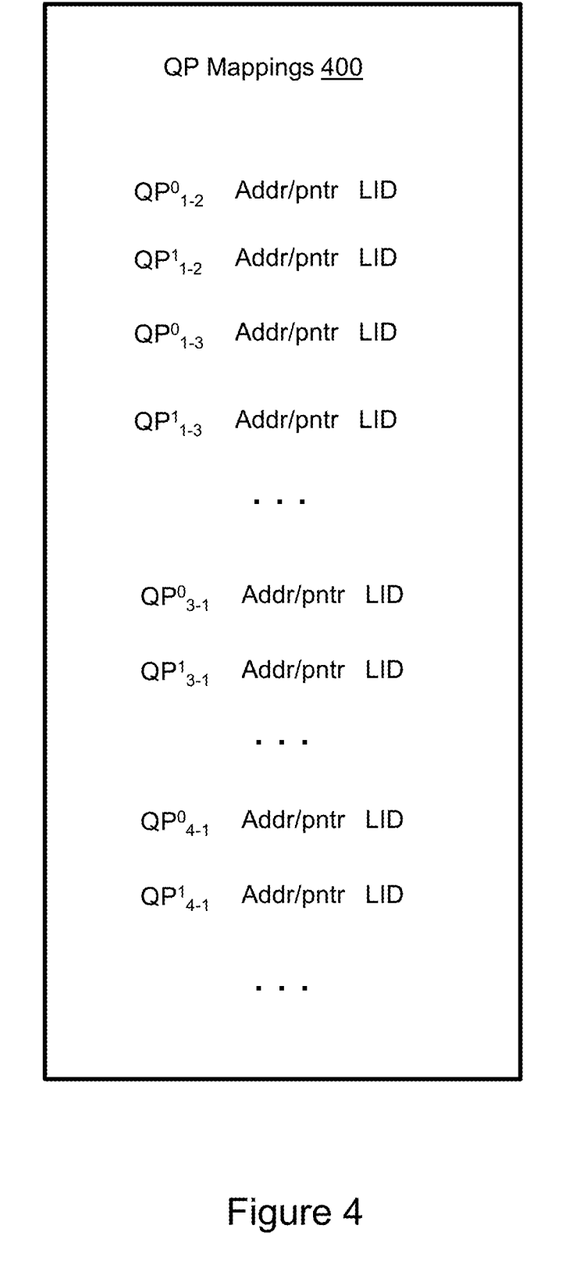
FIG. 4 illustrates aspects of queue pair mappings.

Referring to FIGS. 2 through 4, the channel adapters 214 and switches SW0, SW1 of the dual-star fabric are configured to enable the storage engines to access the cache of other storage engines so that cache memory is available as a globally shared resource. IB (Infiniband) switches will be described as an implementation, but a wide variety of switches and switching protocols could be used. Each channel adapter 214 includes two ports, Port 0 and Port 1. The two ports correspond to the two switches SW 0, SW 1 of the fabric which provides point-to-point connectivity between directors, e.g. Port 0 corresponding to switch SW 0 and Port 1 corresponding to switch SW 1. Communications via the channel adapters and switches are accomplished by using statically configured QPs (Queue Pairs). For example, $QP^0_{1-2}$ provides a point-to-point communication link from a CA (channel adapter) of director "1" to a CA of director "2" via switch SW 0. Each QP includes a source (transmit) queue associated with the source-side director and a corresponding destination (receive) queue associated with the destination-side director. A QP is an addressable entity, and QP mappings 400 which are maintained in a QP pool may include QP identifiers, an address or pointer to a corresponding address space allocated to the queue, and a type of address such as a LID (Local Identifier). A message being sent from director 1 to director 2 is sent to either the corresponding transmit queue $QP^0_{1\text{-}2}$ associated with port 0 or the corresponding transmit queue $QP^1_{1\text{-}2}$ associated with port 1 depending on availability and load balancing, as will be explained in greater detail below. An address or pointer to the queue is obtained from the mapping 400. The message is packetized and the LID is appended to the message as a header. The switch associated with the port routes the packetized message to the corresponding receive queue based on the LID. The message is then processed at the receiving director channel adapter 214. For example, the message can prompt a RDMA operation such as a read or write from an address range of the cache of the receiving director. The corresponding data is copied from the cache of the receiving director, without use of the CPU, into a transmit queue associated with a QP that connects to the requesting director, e.g., $QP^0_{2\text{-}1}$ or $QP^0_{2\text{-}1}$. The data is packetized and an LID is appended thereto. The corresponding switch uses the LID to route the packet to the CA of the requesting director. QPs would be added or removed if corresponding engines were added or removed, but are otherwise static in the sense that the mappings persist even if the corresponding queues are empty or components fail.

Figure 5:
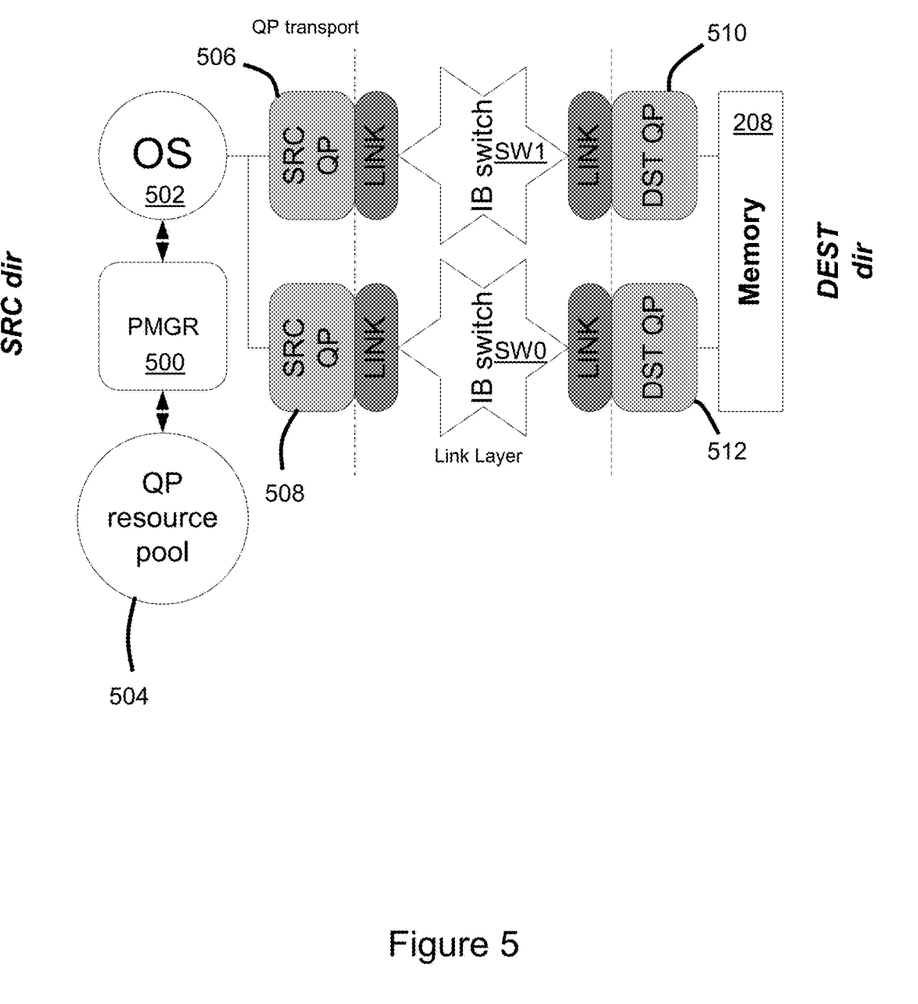
FIG. 5 illustrates aspects of the relationship between source directors and destination directors.

Referring to FIG. 5, each director is a potential QP source for other destination directors, and also a potential destination director for other source directors. Each director includes a path manager module 500 which operates with the OS (Operating System) 502 and QP resource pool 504 of that director. Functions performed by the path manager module 500 may include path/QP selection and adjustment, load balancing/resource management, automatic path recovery, and asynchronous event handling. For example, the path management module tracks path state from QP sources 506, 508 to routed QP destinations 510, 512 and provides the information needed to send traffic to any requested destination node in the storage system. A logical path describes the availability of a fabric resource from one source to a destination, and a physical path, describes the availability of a fabric port or link from a source port to a destination port. The availability of paths depends on the state of the links across the dual-switch fabric as well as the state of the QPs (sometimes referred to herein as resources). If a link or QP is not available, the path manager identifies and selects an alternate link or QP to the destination if one is available.

Figure 6:
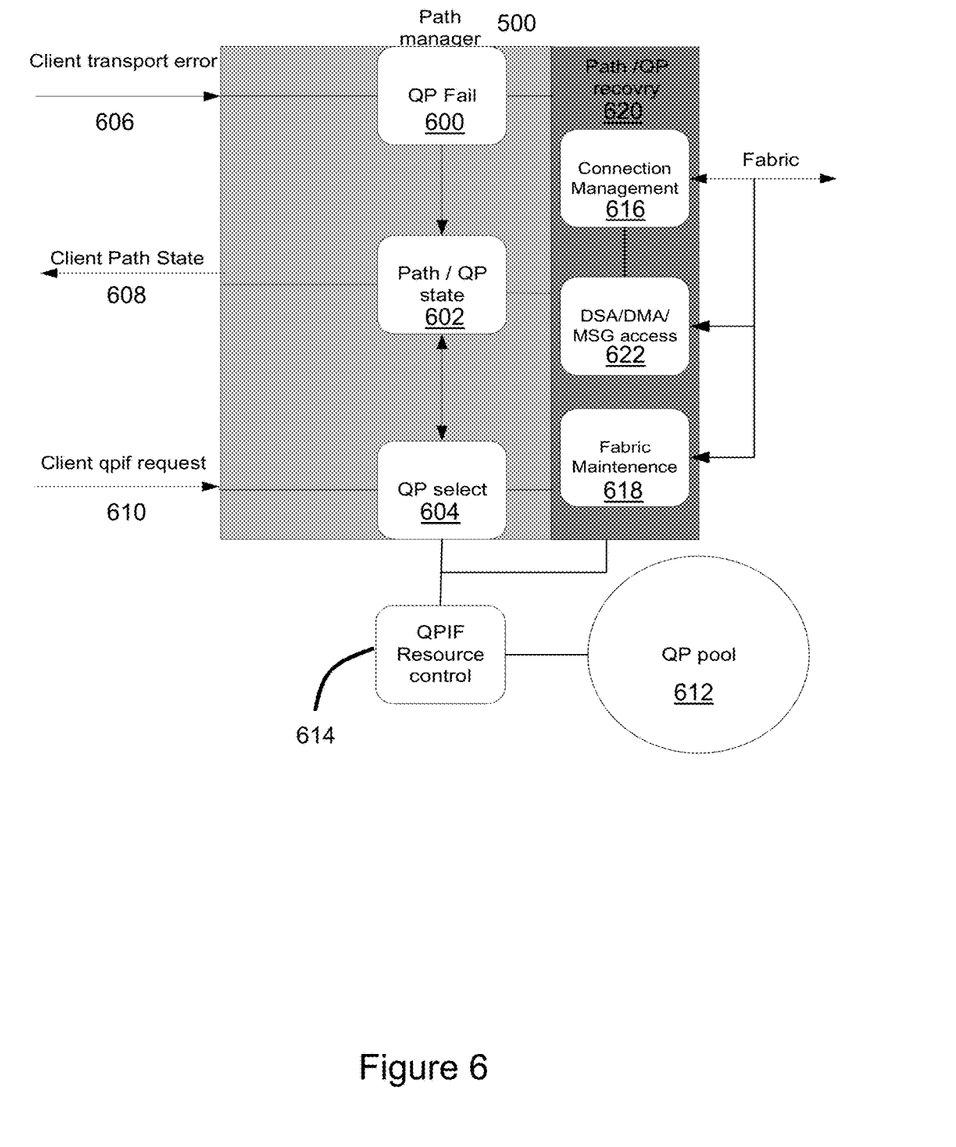
FIG. 6 illustrates the path manager in greater detail.

Referring to FIG. 6, the path manager 500 includes a path/QP recovery manager 620 and three interfaces 600, 602, 604 to each client. Interface 600 is used to signal client transport errors 606 to the path manager. Interface 602 is used to signal client path state 608 relative to a QP. Interface 604 is used for client QPIF requests 610. Each client has a QP pool 612 with mappings of QPs which collectively enable the client to reach every director in the storage system. Logical paths are categorized into three main groups: DSA (direct single access), DMA (direct multi access) and MSG (messages). DSA and DMA are RDMA types and MSG are system messaging types. Under each group is a set of paths associated with each type of IB transport or QP active in the system. The size of each group varies depending on the system QP resource requirements. Under each sub-group, there will normally be at least two QPs (one per switch) attached to every active director in the storage system.

Figure 7:
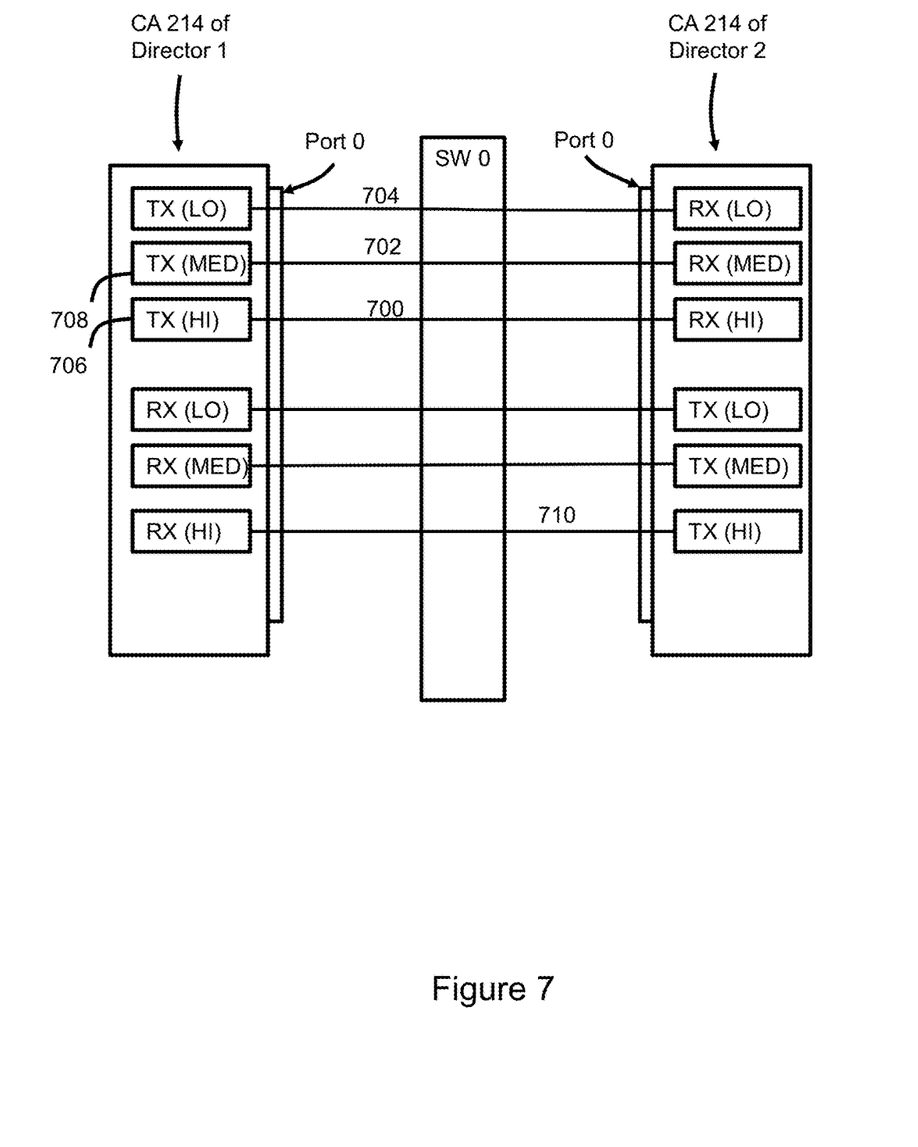
FIG. 7 illustrates prioritized queue pairs.

Referring now to FIGS. 6 and 7, when a path manager client makes a request for a fabric resource, a software interface is returned, e.g. a QPIF (queue pair interface). In response to a client QPIF request 610, QPIF resource controller 614 selects a QP from the QP pool 612. The QPIF request 610 may indicate a quality of service associated with a transaction type, e.g. High, Medium or Low. A high quality of service corresponds to a low latency QP, whereas a low quality of service corresponds to a relatively high latency QP. Multiple related QPs with different quality of service (latency) designations may interconnect a given pair of directors via the same port and switch. For example, a high quality of service (low latency) QP 700 between director 1 and director 2 via switch SW 0 may have priority over a medium quality of service (medium latency) QP 702 between director 1 and director 2 via switch SW 0, which in turn may have priority over a low quality of service (high latency) QP 704 between director 1 and director 2 via switch SW 0. Any of a wide variety of prioritization techniques could be used, but for purposes of illustration the medium latency QP 702 does not transmit until the corresponding low latency QP 700 transmit queue 706 is empty, and the high latency QP 704 does not transmit until the corresponding medium latency QP transmit queue 708 is empty. The QPIF resource controller selects a corresponding QP from the pool based on the indicated quality of service. The selected QP is returned to the requestor and then used for executing the transaction. If a corresponding QP is not available from the pool then a "no path available" reply is returned to the client.

Figure 8:
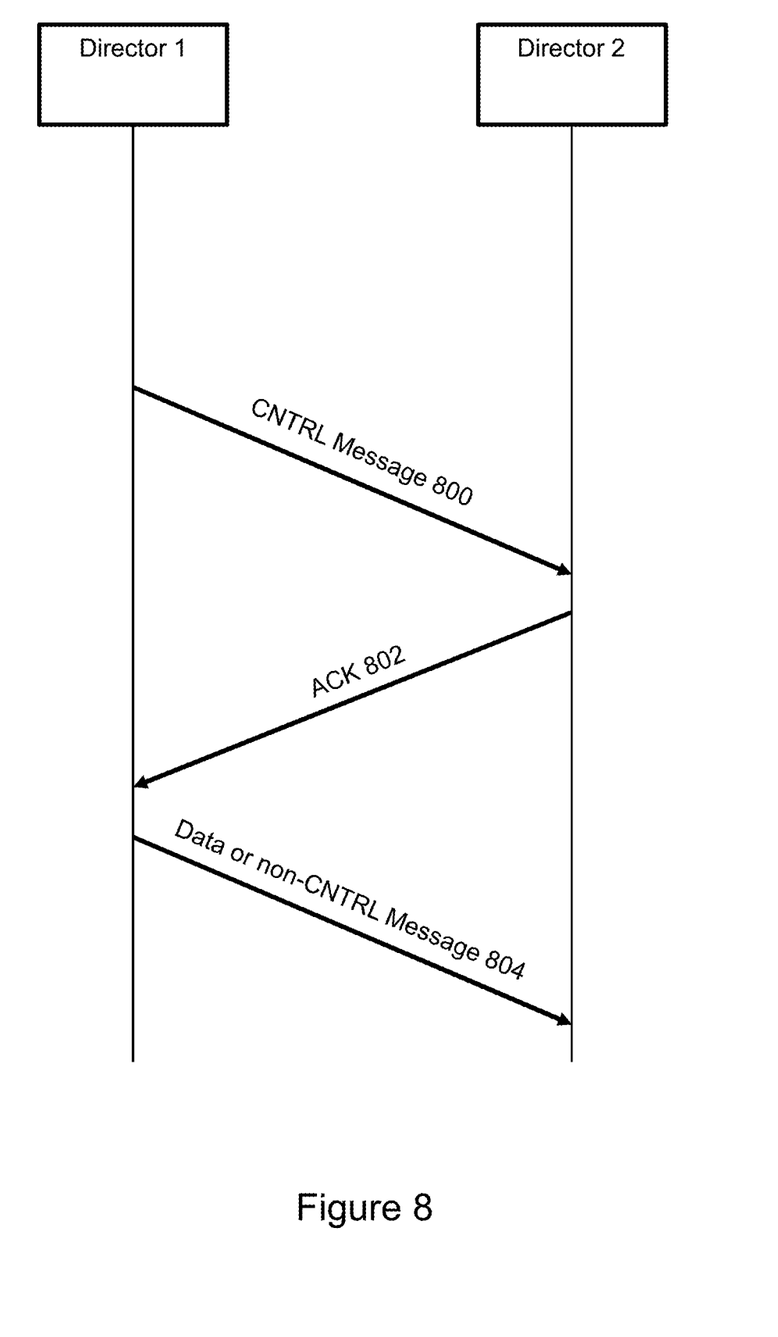
FIG. 8 illustrates an RDMA operation.

Referring now to FIGS. 7 and 8, system message transactions may use higher quality of service QPs than RDMA data. For example and without limitation, the medium quality of service (medium latency) QPs might be used for RDMA data and the high quality of service (low latency) QPs might be used for messages, e.g., atomics used to lock/unlock slots in the cache memory. For example, in order for director 1 to prompt copying of data into the cache memory of director 2, a short CNTRL message 800 is sent from director 1 to director 2 in order to lock the corresponding memory slots in director 2. The QPIF resource controller of director 1 selects the high quality of service (low latency) QP 700 to send the CNTRL message 800. Director 2 responds to the CNTRL message by locking the slots and sending a short ACK message 802 to director 1. The QPIF resource controller of director 2 selects a high quality of service (low latency) QP 710 to send the ACK message 802. In response to the ACK message director 1 sends data 804 to director 2. The QPIF resource controller of director 1 selects a medium quality of service (medium latency) QP 702 or low quality of service QP 704 to send the data. Medium and low quality of service QPs may also be used for some non-CNTRL messages 804.

Figure 9:
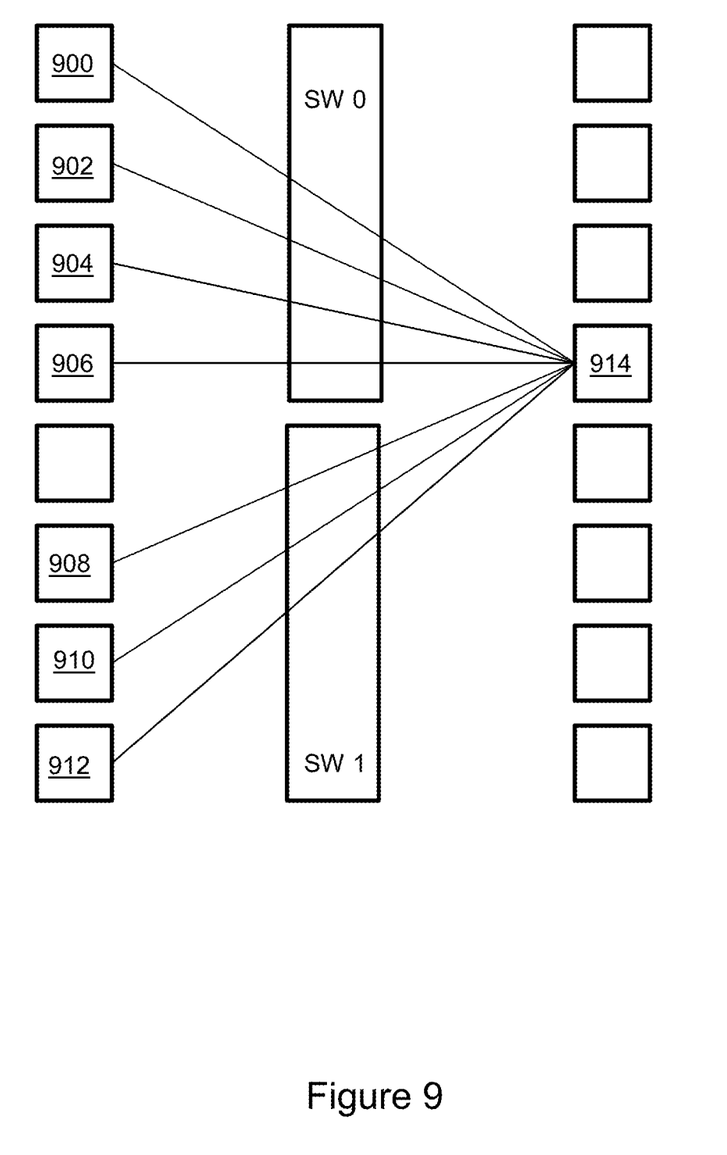
FIG. 9 illustrates a fan-in condition.

The use of a high quality of service (low latency) QP for CNTRL messages helps to quickly secure cache slots for an RDMA operation. Moreover, it generally does not present a great burden on the system because the CNTRL messages and ACKs are short in comparison with the data associated with a typical RDMA. However, in some situations usage of higher quality of service QPs may starve lower quality of service QPs. As shown in FIG. 9 multiple directors 900, 902, 904, 906, 908, 910, 912 may contemporaneously, or nearly contemporaneously, communicate with one director 914 via higher quality of service QPs. For example, multiple source directors may attempt to lock cache slots in one receiver director. If the situation continues and is not remediated it can lead to system-wide problems. Therefore, remedial actions may be taken as explained bellow.

Figure 10:
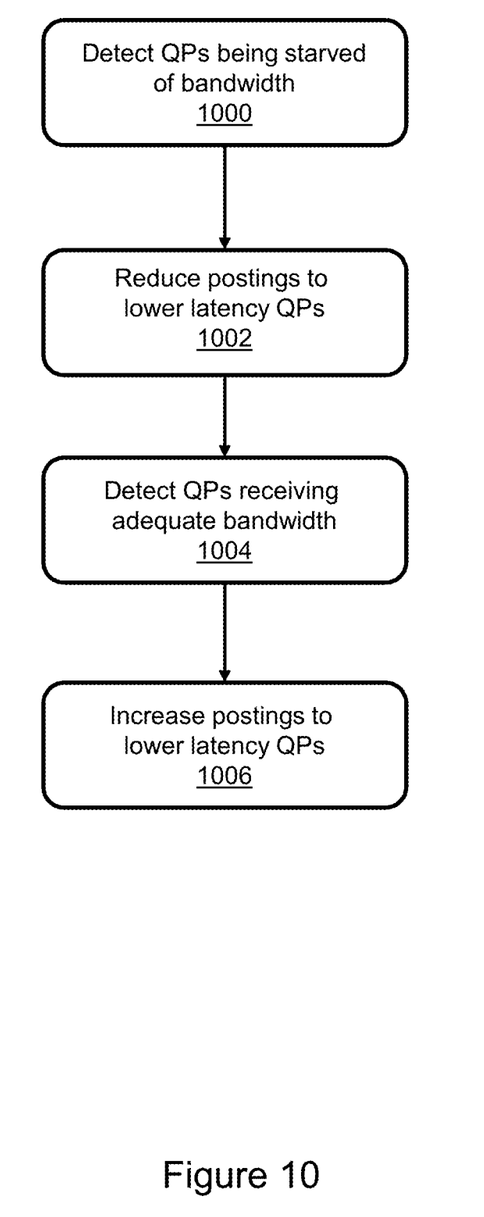
FIG. 10 illustrates detection and remediation of queue pair bandwidth starvation.

Referring to FIG. 10, the path managers monitor the QPs for bandwidth utilization. For example, the access module may determine bandwidth utilization on a per QP basis. Monitoring enables the path managers to detect when associated QPs are being starved of bandwidth due to congestion as indicated at 1000. The expression "starved of bandwidth" is used broadly to indicate a level of bandwidth utilization which could be from zero to any other non-optimal value. The value may be set as a configuration parameter or dynamically determined. A wide variety of monitoring techniques may be employed, including but not limited to indications based on queue fullness, transaction completion rate and RDM completion rate, and combinations thereof. In response to detecting that QPs are being starved of bandwidth the path manager prompts reduction of postings to high quality of service (low latency) QPs which are starving other lower quality of service QPs as indicated at 1002. The reduction may be abrupt, gradual or in accordance with any of a wide variety of functions. For example and without limitation, the QPIF resource controller could pull the low latency QPs out of the QP pool, thereby logically disabling the path and abruptly reducing postings to the lower latency QP. The reduction of postings to the lower latency QPs will make bandwidth available to the higher latency QPs. The same monitoring mechanisms will then detect that the QPs are receiving adequate bandwidth as indicated at 1004. In response, the path manager prompts increase in postings to high quality of service (low latency) QPs as indicated at 1006. The increase may be abrupt, gradual or in accordance with any of a wide variety of functions. For example and without limitation, the connection manager could restore disabled QPs by adding them back to the pool.

Some aspects, features and implementations may comprise computer components and computer-implemented steps or processes that will be apparent to those skilled in the art. For example, it should be understood by one of skill in the art that the computer-implemented steps or processes may be stored as computer-executable instructions on a non-transitory computer-readable medium. Furthermore, it should be understood by one of skill in the art that the computer-executable instructions may be executed on a variety of physical processor devices. For ease of exposition, not every step or element is described herein as part of a computer system, but those skilled in the art will recognize steps and elements that may have a corresponding computer system or software component. Such computer system and software components are therefore enabled by describing their corresponding steps or elements, and are within the scope of the disclosure.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
    a data storage system comprising:
        a plurality of data storage devices;
        a plurality of storage nodes configured to access the data storage devices and communicate with another device; and
        a first switch and a second switch, each of which interconnects each pair of the storage nodes via a plurality of prioritized point-to-point links;
    wherein each storage node is configured to utilize the point-to-point links to transmit system message transactions and to access memory components associated with other storage nodes of the plurality of storage nodes, and to reduce postings to a relatively higher priority link, that is used to transmit the system message transactions, when a corresponding relatively lower priority link, that is used to access memory components, is starved of bandwidth, and the relatively higher priority link and the relatively lower priority link are both between a first pair of storage nodes via the first switch.

2. The apparatus of claim 1 comprising a queue pair uniquely associated with each point-to-point link, each queue pair comprising a transmit queue and a receive queue.

3. The apparatus of claim 2 wherein the point-to-point links are prioritized in terms of quality of service.

4. The apparatus of claim 3 wherein quality of service comprises latency.

5. The apparatus of claim 4 comprising a path manager configured to select a queue pair from a queue pool based on a quality of service indicated by a requesting client.

6. The apparatus of claim 5 wherein system message transactions use higher quality of service queue pairs than remote direct memory access data.

7. The apparatus of claim 6 wherein the path manager is configured to monitor the queue pairs for bandwidth utilization on a per queue pair basis.

8. The apparatus of claim 7 wherein, in response to detecting that a first queue pair is starved of bandwidth by a second queue pair as determined based on per queue pair monitoring, the path manager reduces postings to the second queue pair.

9. The apparatus of claim 8 wherein the path manager reduces postings to the second queue pair by pulling the second queue pair out of the queue pair pool.

10. The apparatus of claim 8 wherein, in response to detecting that bandwidth starvation of the first queue pair by the second queue pair is remediated, the path manager increases postings to the second queue pair.

11. A method comprising:
    in a data storage system comprising a plurality of data storage devices, a plurality of storage nodes configured to access the data storage devices and communicate with another device, and a first switch and a second switch, each of which interconnects each pair of the storage nodes via a plurality of prioritized point-to-point links:
    utilizing the point-to-point links to transmit system message transactions and to access memory components associated with other storage nodes of the plurality of storage nodes; and
    reducing postings to a relatively higher priority link, that is used to transmit the system message transactions, when a corresponding relatively lower priority link, that is used to access memory components, is starved of bandwidth, and the relatively higher priority link and the relatively lower priority link are both between a first pair of storage nodes via the first switch.

12. The method of claim 11 comprising maintaining a queue pair uniquely associated with each point-to-point link, each queue pair comprising a transmit queue and a receive queue.

13. The method of claim 12 comprising associating a quality of service with each point-to-point link.

14. The method of claim 13 wherein quality of service comprises a latency associated with utilizing the point-to-point links to other storage nodes of the plurality of storage nodes.

15. The method of claim 14 comprising a path manager selecting a queue pair from a queue pool based on a quality of service indicated by a requesting client.

16. The method of claim 15 comprising using higher quality of service queue pairs for system message transactions and lower quality of service queue pairs for remote direct memory access data.

17. The method of claim 16 comprising the path manager monitoring the queue pairs for bandwidth utilization on a per queue pair basis.

18. The method of claim 17 comprising, in response to detecting that a first queue pair is starved of bandwidth by a second queue pair as determined based on per queue pair monitoring, the path manager reducing postings to the second queue pair.

19. The method of claim 18 comprising the path manager reducing postings to the second queue pair by pulling the second queue pair out of the queue pair pool.

20. The method of claim 18 comprising, in response to detecting that bandwidth starvation of the first queue pair by the second queue pair is remediated, the path manager increasing postings to the second queue pair.

\* \* \* \* \*